United States Patent
Aimono

(10) Patent No.: US 8,841,821 B2
(45) Date of Patent: Sep. 23, 2014

(54) DRIVER FOR OPTICAL DEFLECTOR USING TWO MODIFIED SYNCRONOUS SAW-TOOTH DRIVE VOLTAGES AND METHOD FOR SETTING THE SAME

(75) Inventor: Takanori Aimono, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 195 days.

(21) Appl. No.: 13/426,276

(22) Filed: Mar. 21, 2012

(65) Prior Publication Data

US 2012/0242191 A1 Sep. 27, 2012

(30) Foreign Application Priority Data

Mar. 22, 2011 (JP) .................. 2011-062919

(51) Int. Cl.
*H02N 2/00* (2006.01)
*G02B 26/08* (2006.01)

(52) U.S. Cl.
CPC .......... *G02B 26/0858* (2013.01); *H02N 2/0075* (2013.01)
USPC .......................................... 310/332; 310/317

(58) Field of Classification Search
CPC . G02B 26/0858; H02N 2/0075; H02N 2/008; H02N 2/14; H02N 2/142; H02N 2/145; H02N 2/147

USPC .................................................. 310/330–332
See application file for complete search history.

(56) References Cited

U.S. PATENT DOCUMENTS

2011/0032590 A1*  2/2011  Terada et al. .............. 359/199.4

FOREIGN PATENT DOCUMENTS

JP  2009-223165 A  10/2009

* cited by examiner

*Primary Examiner* — Derek Rosenau
(74) *Attorney, Agent, or Firm* — Holtz Holtz Goodman & Chick PC

(57) ABSTRACT

In an optical deflector including a mirror, a movable frame supporting the mirror, a support body surrounding the movable frame, and a first group of piezoelectric actuators and a second group of piezoelectric actuators alternating with the first group of piezoelectric actuators, a driver combines first and second original saw-tooth waves having the same waveform into first saw-tooth waves, and applies a first drive voltage having the first saw-tooth waves to the first group of piezoelectric actuators. The driver applies a second drive voltage having second saw-tooth waves opposite in phase with the first saw-tooth waves to the second group of piezoelectric actuators.

3 Claims, 15 Drawing Sheets

PRIOR ART

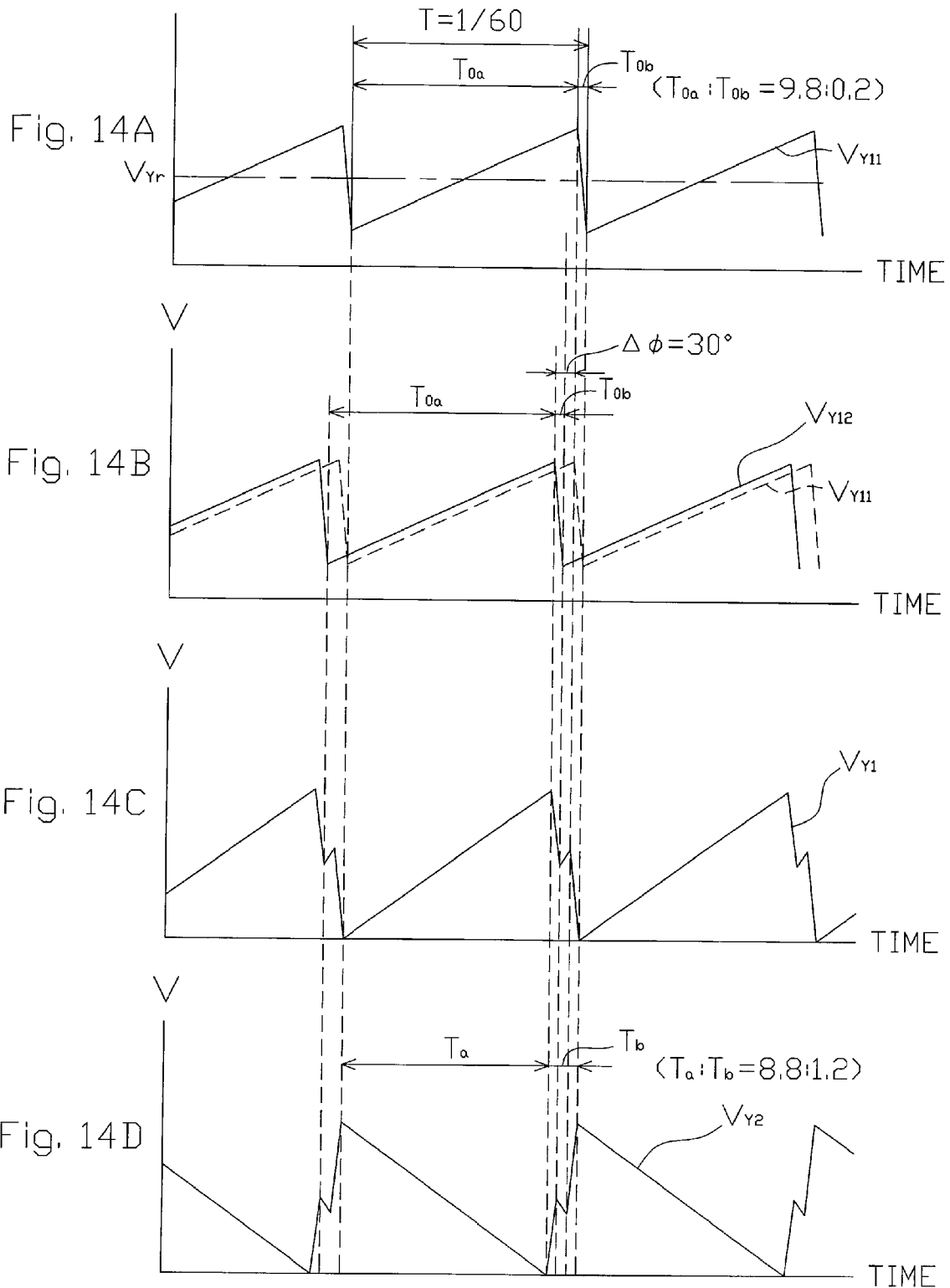

DRIVER FOR OPTICAL DEFLECTOR USING TWO MODIFIED SYNCRONOUS SAW-TOOTH DRIVE VOLTAGES AND METHOD FOR SETTING THE SAME

This application claims the priority benefit under 35 U.S.C. §119 to Japanese Patent Application No. JP2011-062919 filed on Mar. 22, 2011, which disclosure is hereby incorporated in its entirety by reference.

BACKGROUND

1. Field

The presently disclosed subject matter relates to a driver for driving an optical deflector and a method for setting drive voltages therefor.

2. Description of the Related Art

A prior art two-dimensional optical deflector is constructed by a mirror; a movable frame surrounding the mirror for supporting the mirror through a pair of torsion bars; inner piezoelectric actuators fixed between the movable frame and the torsion bars and serving as cantilevers for rocking the mirror through the torsion bars with respect to an X-axis of the mirror; a support body surrounding the movable frame; and meander-shaped outer piezoelectric actuators fixed between the support body and the movable frame and serving as cantilevers for rocking the mirror through the movable frame with respect to a Y-axis of the mirror perpendicular to the X-axis (see: JP2009-223165A).

Generally, in an optical scanner, the mirror is rocked with respect to the X-axis for a horizontal deflection at a high frequency such as 15 kHz, while the mirror is rocked with respect to the Y-axis for a vertical deflection at a low frequency such as 60 Hz.

In the described prior art two-dimensional optical deflector, since the inner piezoelectric actuators rock the mirror through the torsion bars, the inner piezoelectric actuators are driven by synchronous sinusoidal-wave drive voltages.

On the other hand, since the outer piezoelectric actuators rock the mirror without torsion bars, the outer piezoelectric actuators are driven by synchronous saw-tooth drive voltages. In more detail, the outer piezoelectric actuators are folded at every actuator or jetting, and a first group of the outer piezoelectric actuators and a second group of the outer piezoelectric actuators alternating with the first group of the outer piezoelectric actuators are driven by two synchronous saw-tooth drive voltages, respectively.

However, when the first and second groups of the outer piezoelectric actuators are driven by such two synchronous saw-tooth drive voltages, the synchronous saw-tooth drive voltages include harmonic frequency components in addition to their fundamental frequency. Therefore, even when the fundamental frequency of the synchronous saw-tooth drive voltages is smaller than the natural frequencies of a mechanically-vibrating system of the mirror with respect to the Y-axis depending upon the structure of the outer piezoelectric actuators, one of the above-mentioned harmonic frequency components would coincide with one of the natural frequencies or be brought close to one of the natural frequencies. In this case, this harmonic frequency component of the drive voltages would resonate with such a natural frequency of the mechanically-vibrating system of the mirror with respect to the Y-axis, so that a higher frequency vibration would be superimposed onto the rocking of the mirror with respect to the Y-axis.

In order to avoid higher frequency vibration of the mirror, one approach is to make the natural frequencies much larger than the fundamental frequency of the synchronous saw-tooth drive voltages. In this case, however, since the mechanically-vibrating system of the mirror including the outer piezoelectric actuators is hardened, it would be difficult to rock the mirror at a larger deflection angle.

Another approach is to use synchronous sinusoidal-wave drive voltages whose frequency is much larger than the natural frequencies of the mechanically-vibrating system of the mirror with respect to the Y-axis, instead of the synchronous saw-tooth drive voltages. In this case, however, a linearly-deflected period within one period of the synchronous sinusoidal-wave drive voltages where the deflection angle is linearly changed becomes too small, i.e., an effective scanning period becomes too small, so it is not practical in an image display apparatus such as a projector to use such an optical deflector.

SUMMARY

The presently disclosed subject matter seeks to solve one or more of the above-described problems.

According to the presently disclosed subject matter, in an optical deflector comprising a mirror, a movable frame for supporting the mirror, a support body surrounding the movable frame, and a first group of piezoelectric actuators serving as cantilevers and a second group of piezoelectric actuators serving as cantilevers alternating with the first group of piezoelectric actuators, the piezoelectric actuators are folded at every actuator and connected from the support body to the movable frame. Each of the piezoelectric actuators is in parallel with one axis of the mirror. A driver combines first and second original saw-tooth waves having the same waveform into first saw-tooth waves. The driver generates a first drive voltage having the first saw-tooth waves and applies the first drive voltage to the first group of piezoelectric actuators. The driver generates a second drive voltage having second saw-tooth waves opposite in phase to the first saw-tooth waves, and applies the second drive voltage to the second group of piezoelectric actuators. A difference in phase between the first and second original saw-tooth waves is a predetermined value to suppress the coincidence between a natural frequency of a mechanically-vibrating system of the mirror with respect to the axis thereof depending upon the piezoelectric actuators and the frequency of the mirror.

According to the presently disclosed subject matter, since use is made of modified synchronous saw-tooth waves, the deflection angle can be linearly changed for a longer period, so that the optical deflector according to the presently disclosed subject matter can be applied to an image display apparatus such as a projector. Also, the resonance of the harmonic frequency components of the first and second drive voltages with the natural frequency components of the mechanically-vibrating system of the mirror can be suppressed.

Also, in a method for setting drive data for driving an optical deflector including a mirror, a movable frame for supporting the mirror, a support body surrounding the movable frame, and a first group of piezoelectric actuators serving as cantilevers and a second group of piezoelectric actuators serving as cantilevers alternating with the first group of piezoelectric actuators, the piezoelectric actuators being folded at every actuator and connected from the support body to the movable frame, each of the piezoelectric actuators being in parallel with one axis of the mirror, a period is set common to first and second drive voltages for the first and second groups of piezoelectric actuators, respectively. Then, a ratio of a rising period to a falling period is designated. In this case, a total of the rising period and the falling period is equal to the period to select first original drive data forming a first original saw-tooth wave having the rising period and the falling period. Then, the first original drive data is shifted by a shift value corresponding to a half wave-length of a natural frequency of a mechanically-vibrating system of the mirror with respect to the axis thereof depending upon the piezoelectric actuators to obtain second original drive data. Then, the first and second original drive data are combined into first drive data forming a first saw-tooth wave for the first group of piezoelectric actuators. Finally, the first drive data is inverted to obtain second drive data forming a second saw-tooth wave for the second group of piezoelectric actuators.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein:

FIGS. 14A, 14B, 14C and 14D are timing diagrams of other examples of the drive voltages $V_{y11}$, $V_{y12}$, the drive voltage $V_{y1}$ and the drive voltage $V_{y2}$, at steps 703, 704, 705 and 706 of FIG. 7.

DETAILED DESCRIPTION OF EXEMPLARY EMBODIMENTS

Figure 1:
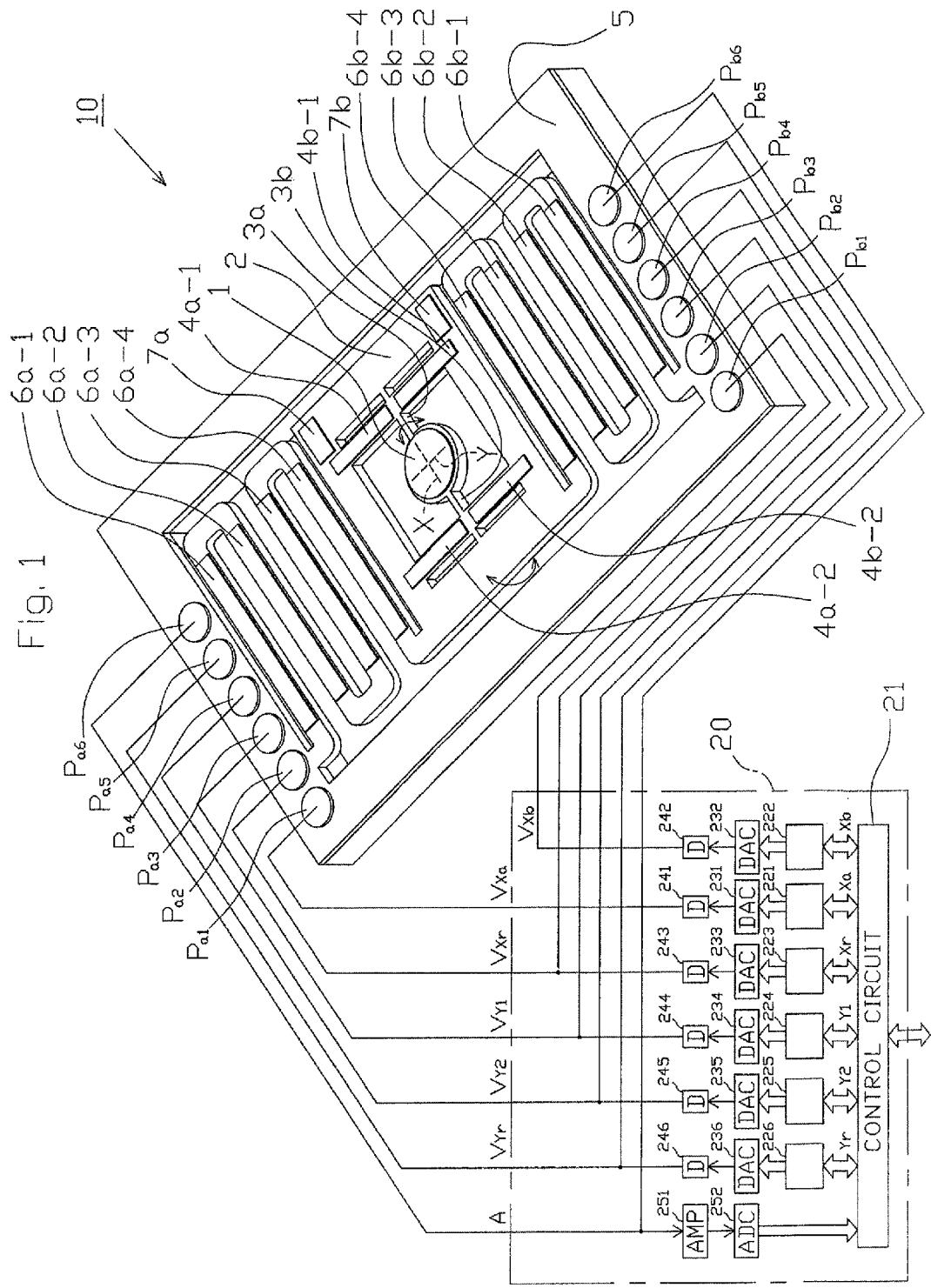
FIG. 1 is a view illustrating an embodiment of the driver for driving an optical deflector according to the presently disclosed subject matter.

In FIG. 1, which illustrates an embodiment of the driver for driving an optical deflector according to the presently disclosed subject matter, an optical deflector 10 and its driver 20 are provided.

The optical deflector 10 is constructed by a circular mirror 1 for reflecting an incident light, a movable frame 2 surrounding the mirror 1 for supporting the mirror 1 through a pair of torsion bars 3a and 3b, inner piezoelectric actuators 4a-1, 4a-2, 4b-1 and 4b-2 fixed between the movable frame 2 and the torsion bars 3a and 3b and serving as cantilevers for rocking the mirror 1 through the torsion bars 3a and 3b with respect to an X-axis of the mirror 1, a support body 5 surrounding the movable frame 2, outer piezoelectric actuators 6a-1, 6a-2, 6a-3 and 6a-4 and 6b-1, 6b-2, 6b-3 and 6b-4 fixed between the support body 5 and the movable frame 2 and serving as cantilevers for rocking the mirror 1 through the movable frame 2 with respect to a Y-axis of the mirror 1 perpendicular to the X-axis, and piezoelectric sensors 7a and 7b on the movable frame 2.

The torsion bars 3a and 3b are arranged along the X-axis, and have ends coupled to the inner circumference of the movable frame 2 and other ends coupled to the outer circumference of the mirror 1. Therefore, the torsion bars 3a and 3b are twisted by the inner piezoelectric actuators 4a-1, 4a-2, 4b-1 and 4b-2 to rock the mirror 1 with respect to the X-axis.

The inner piezoelectric actuators 4a-1 and 4b-1 oppose each other along the Y-axis and sandwich the torsion bar 3a. The inner piezoelectric actuators 4a-1 and 4b-1 have ends coupled to the inner circumference of the movable frame 2 and other ends coupled to the torsion bar 2a. In this case, the flexing direction of the inner piezoelectric actuator 4a-1 is opposite to that of the inner piezoelectric actuator 4b-1.

Similarly, the inner piezoelectric actuators 4a-2 and 4b-2 oppose each other along the Y-axis and sandwich the torsion bars 3b. The inner piezoelectric actuators 4a-2 and 4b-2 have ends coupled to the inner circumference of the movable frame 2 and other ends coupled to the torsion bar 2b. In this case, the flexing direction of the inner piezoelectric actuator 4a-2 is opposite to that of the inner piezoelectric actuator 4b-2.

The support body 5 is rectangularly-framed to surround the movable frame 2.

The outer piezoelectric actuators 6a-1, 6a-2, 6a-3 and 6a-4, 6b-1, 6b-2, 6b-3 and 6b-4 are coupled between the inner circumference of the support body 5 and the outer circumference of the movable frame 2, in order to rock the movable frame 2 associated with the mirror 1 with respect to the support body 5, i.e., to rock the mirror 1 with respect to the Y-axis.

The outer piezoelectric actuators 6a-1, 6a-2, 6a-3 and 6a-4 are serially-coupled from the support body 5 to the movable frame 2. Also, each of the outer piezoelectric actuators 6a-1, 6a-2, 6a-3 and 6a-4 are in parallel with the X-axis of the mirror 1. Therefore, the outer piezoelectric actuators 6a-1, 6a-2, 6a-3 and 6a-4 are folded at every actuator or meandering from the support body 5 to the movable frame 2, so that the amplitudes of the outer piezoelectric actuators 6a-1, 6a-2, 6a-3 and 6a-4 can be changed along directions perpendicular to the Y-axis of the mirror 1.

Similarly, the outer piezoelectric actuators 6b-1, 6b-2, 6b-3 and 6b-4 are serially-coupled from the support body 5 to the movable frame 2. Also, each of the outer piezoelectric actuators 6b-1, 6b-2, 6b-3 and 6b-4 are in parallel with the X-axis of the mirror 1. Therefore, the outer piezoelectric actuators 6b-1, 6b-2, 6b-3 and 6b-4 are folded at every actuator or meandering from the support body 5 to the movable frame 2, so that the amplitudes of the outer piezoelectric actuators 6b-1, 6b-2, 6b-3 and 6b-4 can be changed along directions perpendicular to the Y-axis of the mirror 1.

The piezoelectric sensors 7a and 7b sense a deflection angle A of the mirror 1 with respect to the Y-axis.

Provided on the optical deflector 10 are pads $P_{a1}$, $P_{a2}$, $P_{a3}$, $P_{a4}$, $P_{a5}$ and $P_{a6}$, $P_{b1}$, $P_{b2}$, $P_{b3}$, $P_{b4}$, $P_{b5}$ and $P_{b6}$ which are connected to the driver 20.

Figure 2:
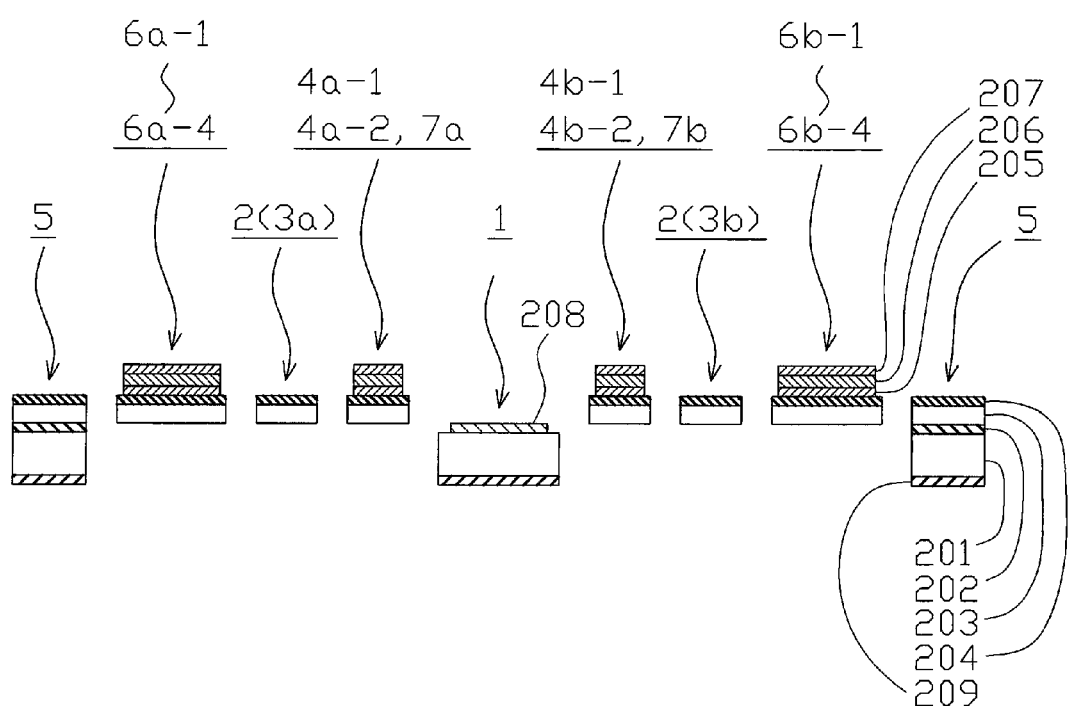
FIG. 2 is a cross-sectional view of the optical deflector of FIG. 1.

The pad $P_{a1}$ is connected to the upper electrode layer 207 (see: FIG. 2) of each of the inner piezoelectric actuators 4a-1 and 4a-2, and the pad $P_{a2}$ is connected to the lower electrode layer 205 (see: FIG. 2) of each of the inner piezoelectric actuators 4a-1 and 4a-2. Also, the pad $P_{a3}$ is connected to the upper electrode layer 207 (see: FIG. 2) of each of the outer piezoelectric actuators 6a-1 and 6a-3, and the pad $P_{a4}$ is connected to the upper electrode layer 207 (see: FIG. 2) of each of the outer piezoelectric actuators 6a-2 and 6a-4. Further, the pad $P_{a5}$ is connected to the lower electrode layer 205 (see: FIG. 2) of each of the outer piezoelectric actuators 6a-1, 6a-2, 6a-3 and 6a-4. Still further, the pad $P_{a6}$ is connected to the upper electrode layer 207 (see: FIG. 2) of the piezoelectric sensor 7a.

On the other hand, the pad $P_{b1}$ is connected to the upper electrode layer 207 (see: FIG. 2) of each of the inner piezoelectric actuators 4b-1 and 4b-2, and the pad $P_{b2}$ is connected to the lower electrode layer 205 (see: FIG. 2) of each of the inner piezoelectric actuators 4b-1 and 4b-2. Also, the pad $P_{b3}$ is connected to the upper electrode layer 207 (see: FIG. 2) of each of the outer piezoelectric actuators 6b-1 and 6b-3, and the pad $P_{b4}$ is connected to the upper electrode layer 207 (see: FIG. 2) of each of the outer piezoelectric actuators 6b-2 and 6b-4. Further, the pad $P_{b5}$ is connected to the lower electrode layer 205 (see: FIG. 2) of each of the outer piezoelectric actuators 6b-1, 6b-2, 6b-3 and 6b-4. Still further, the pad $P_{b6}$ is connected to the upper electrode layer 207 of the piezoelectric sensor 7b.

The driver 20 is constructed by a control circuit 21 such as a microcomputer including a central processing unit (CPU), a read-only memory (ROM), a random access memory (RAM), an input/output (I/O) interface and the like.

The driver 20 further includes a nonvolatile memory 221 for storing drive data Xa for driving the upper electrode layers of the inner piezoelectric actuators 4a-1 and 4a-2, a digital-to-analog converter (DAC) 231 for converting the drive data Xa into a drive voltage $V_{Xa}$, and a drive circuit 241 for applying the drive voltage $V_{Xa}$ to the pad $P_{a1}$.

The driver 20 further includes a nonvolatile memory 222 for storing drive data Xb for driving the upper electrode layers of the inner piezoelectric actuators 4b-1 and 4b-2, a digital-to-analog converter (DAC) 232 for converting the drive data Xb into a drive voltage $V_{Xb}$, and a drive circuit 242 for applying the drive voltage $V_{Xb}$ to the pad $P_{b1}$.

The driver 20 further includes a nonvolatile memory 223 for storing reference data Xr for driving the lower electrode layers of the inner piezoelectric actuators 4a-1, 4a-2, 4b-1 and 4b-2, a digital-to-analog converter (DAC) 233 for converting the reference data Xr into a reference voltage $V_{Xr}$, and a drive circuit 243 for applying the reference voltage $V_{Xr}$ to the pads $P_{a2}$ and $P_{b2}$.

The driver 20 further includes a nonvolatile memory 224 for storing drive data Y1 for driving the upper electrode layers of the outer piezoelectric actuators 6a-1, 6a-3, 6b-1 and 6b-3, a digital-to-analog converter (DAC) 234 for converting the drive data Y1 into a drive voltage $V_{Y1}$, and a drive circuit 244 for applying the drive voltage $V_{Y1}$ to the pads $P_{a3}$ and $P_{b3}$.

The driver 20 further includes a nonvolatile memory 225 for storing drive data Y2 for driving the upper electrode layers of the outer piezoelectric actuators 6a-2, 6a-4, 6b-2 and 6b-4, a digital-to-analog converter (DAC) 235 for converting the drive data Y2 into a drive voltage $V_{Y2}$, and a drive circuit 245 for applying the drive voltage $V_{Y2}$ to the pads $P_{a4}$ and $P_{b4}$.

The driver 20 further includes a nonvolatile memory 226 for storing reference data Yr for driving the lower electrode layers of the outer piezoelectric actuators 6a-1, 6a-2, 6a-3, 6a-4, 6b-1, 6b-2, 6b-3 and 6b-4, a digital-to-analog converter (DAC) 236 for converting the reference data Yr into a reference voltage $V_{Yr}$, and a drive circuit 246 for applying the reference voltage $V_{Yr}$ to the pads $P_{a5}$ and $P_{b5}$.

The driver 20 further includes an amplifier 251 for amplifying an analog deflection angle A of the mirror 1 from the pads $P_{a6}$ and $P_{b6}$ and an analog-to-digital converter (ADC) 252 for converting the analog deflection angle A into a digital deflection angle data.

Note that the number of the outer piezoelectric actuators 6a-1, 6a-2, 6a-3 and 6a-4 and the number of the outer piezoelectric actuators 6b-1, 6b-2, 6b-3 and 6b-4 can be other values such as 2, 6, 8, . . . .

The structure of each element of the optical deflector 10 is explained next with reference to FIG. 2.

In FIG. 2, a monocrystalline silicon support layer 201, an intermediate silicon oxide layer 202 and a monocrystalline silicon active layer 203 are formed by a silicon-on-insulator (SOI) substrate. Also, reference numeral 204 designates a silicon oxide layer, 205 designates a lower electrode layer made of Pt, Au or the like, 206 designates a lead titanate zirconate (PZT) layer, 207 designates an upper electrode layer made of Pt, Au or the like, 208 designates a metal layer made of Al, Ag or the like, and 209 designates a hard mask layer made of silicon oxide or the like.

The mirror 1 is constructed by the monocrystalline silicon support layer 201 serving as a vibration plate, the metal layer 208 serving as a reflector and the hard mask layer 209.

The movable frame 2 as well as the torsion bars 3a and 3b is constructed by the monocrystalline silicon active layer 203 and the silicon oxide layer 204.

The inner piezoelectric actuators 4a-1, 4a-2, 4b-1 and 4b-2 and the outer piezoelectric actuators 6a-1 to 6a-4 and 6b-1 to 6b-4 and the piezoelectric sensors 7a and 7b are constructed by the monocrystalline silicon active layer 203, the silicon oxide layer 204, the lower electrode layer 205, the PZT layer 206 and the upper electrode layer 207.

The support body 5 is constructed by the monocrystalline silicon layer 201, the intermediate silicon layer 202, the monocrystalline silicon active layer 203, the silicon oxide layer 204 and the hard mask layer 209.

The pads $P_{a1}$, $P_{a2}$, $P_{a3}$, $P_{a4}$, $P_{a5}$ and $P_{a6}$, $P_{b1}$, $P_{b2}$, $P_{b3}$, $P_{b4}$, $P_{b5}$ and $P_{b6}$ are constructed by the lower electrode layer 205.

First, an optical deflection or horizontal scanning operation by rocking the mirror 1 with respect to the X-axis is explained below.

That is, the drive voltage $V_{Xa}$ based upon the drive data Xa stored in advance in the nonvolatile memory 221 and the drive voltage $V_{Xb}$ based upon the drive data Xb stored in advance in the nonvolatile memory 222 are sinusoidal at a predetermined frequency such as 15 kHz and symmetrical or opposite in phase to each other with the reference voltage $V_{Xr}$ based upon the reference data Xr stored in advance in the nonvolatile memory 223. As a result, the inner piezoelectric actuators 4a-1 and 4a-2 and the inner piezoelectric actuators 4b-1 and 4b-2 carry out flexing operations in opposite directions to each other, so that the torsion bars 3a and 3b are twisted to rock the mirror 1 with respect to the X-axis.

In the optical deflection or horizontal scanning operation by rocking the mirror 1 with respect to the X-axis, the rising and falling timings of the drive voltage $V_{Xa}$ coincide with the falling and rising timings, respectively, of the drive voltage $V_{Xb}$, so the drive voltages $V_{Xa}$ and $V_{Xb}$ can be said to be synchronous with each other.

Next, an optical deflection or vertical scanning operation by rocking the mirror 1 with respect to the Y-axis is explained below.

The outer piezoelectric actuators 6a-1, 6a-2, 6a-3, 6a-4, 6b-1, 6b-2, 6b-3 and 6b-4 are divided into an odd-numbered group of the outer piezoelectric actuators 6a-1 and 6a-3; 6b-1 and 6b-3, and an even-numbered group of the outer piezoelectric actuators 6a-2 and 6a-4; 6b-2 and 6b-4 alternating with the odd-numbered group of the outer piezoelectric actuators 6a-1 and 6a-3; 6b-1 and 6b-3.

Figure 3:
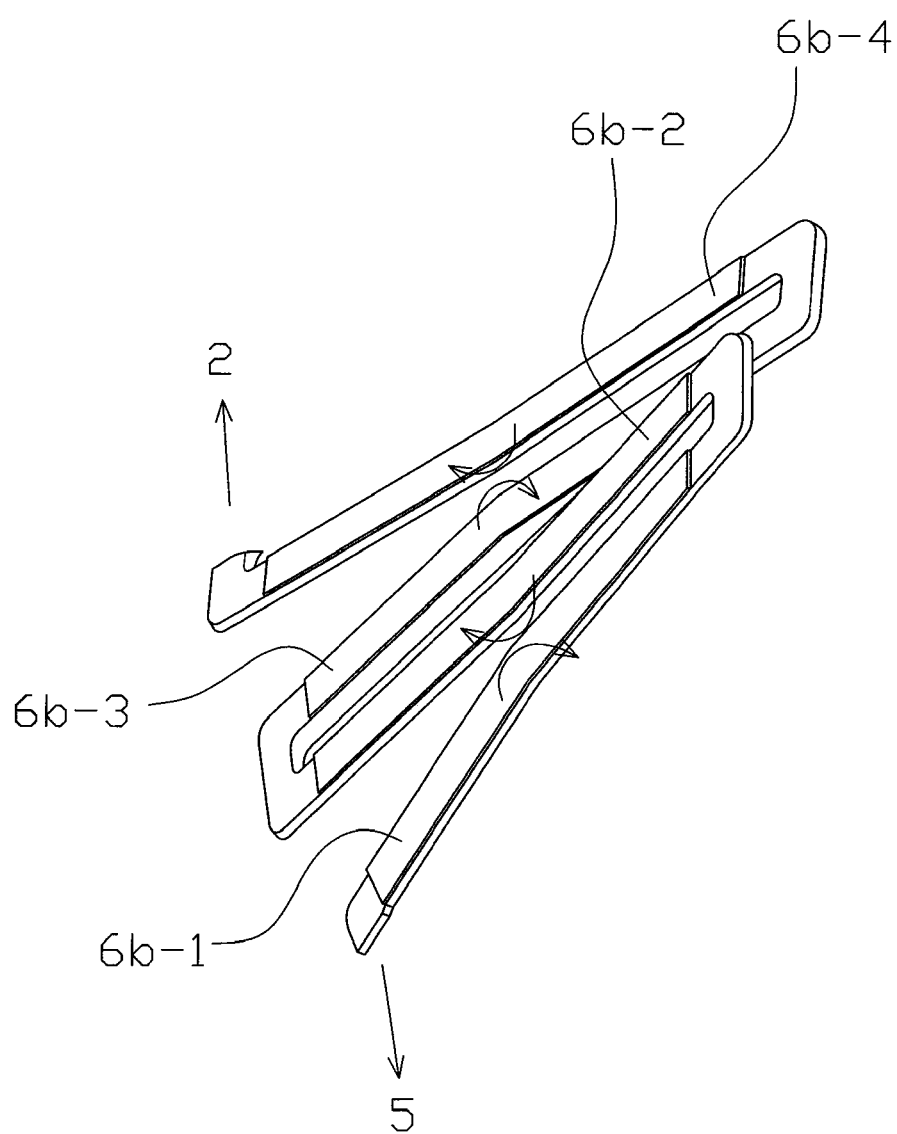
FIG. 3 is a diagram for explaining the operation of the outer piezoelectric actuators of FIG. 1.

As illustrated in FIG. 3 which illustrates only the outer piezoelectric actuators 6b-1, 6b-2, 6b-3 and 6b-4, when the odd-numbered group of the outer piezoelectric actuators 6a-1, 6a-3, 6b-1 and 6b-3 are flexed in one direction, for example, in a downward direction, the even-numbered group of the outer piezoelectric actuators 6a-2, 6a-4, 6b-2 and 6b-4 are flexed in the other direction, i.e., in an upward direction. On the other hand, when the odd-numbered group of the outer piezoelectric actuators 6a-1, 6a-3, 6b-1 and 6b-3 are flexed in the upward direction, the even-numbered group of the outer piezoelectric actuators 6a-2, 6a-4, 6b-2 and 6b-4 are flexed in the downward direction. Thus, the mirror 1 is rocked with respect to the Y-axis.

Figure 4:
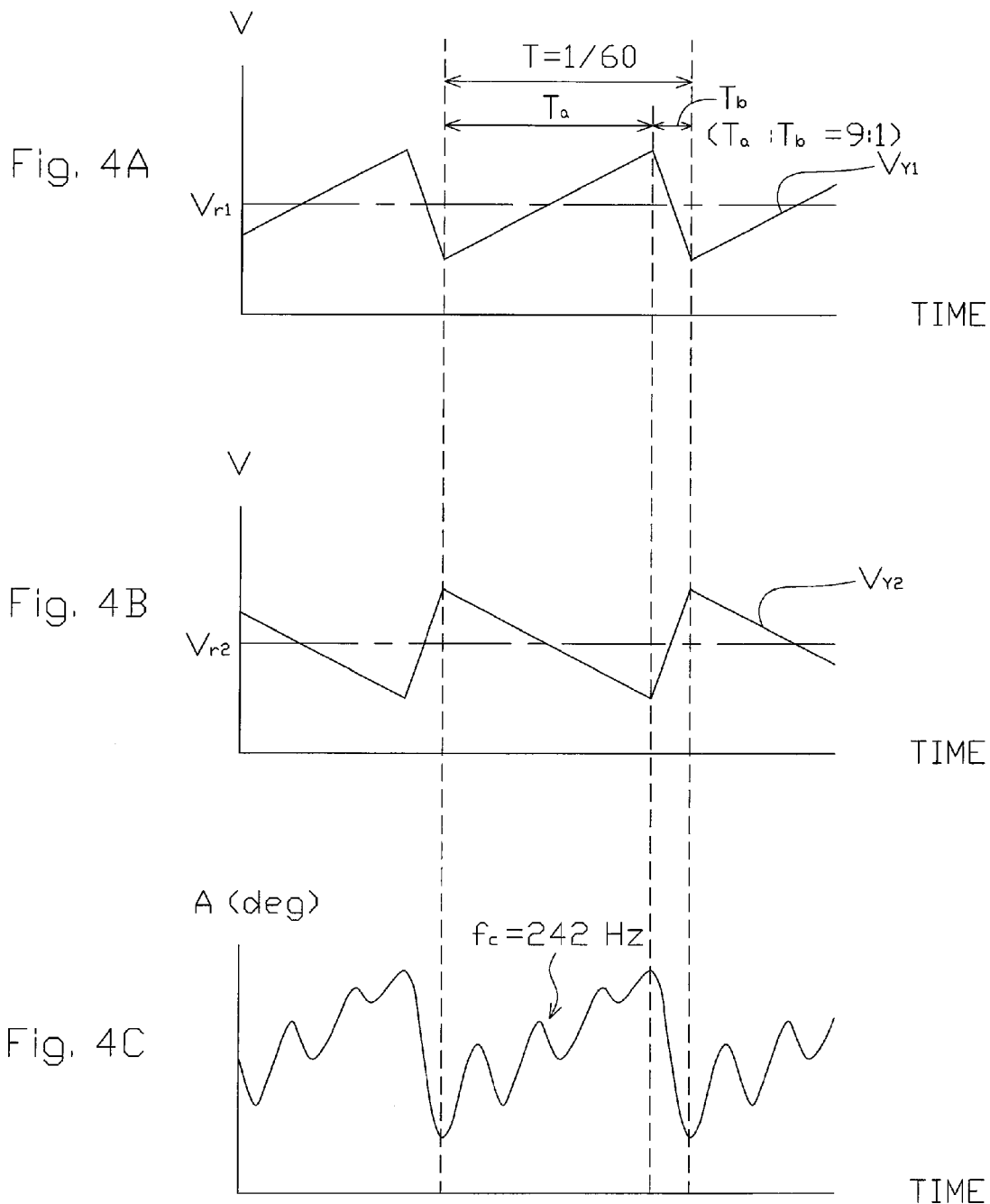
FIGS. 4A, 4B and 4C are timing diagrams for illustrating examples of the drive voltages $V_{y1}$, $V_{y2}$ and the deflection angle A of FIG. 1 when the driver of FIG. 1 is applied to the prior art.

For example, assume that the drive voltage $V_{y1}$ is saw-tooth-shaped as illustrated in FIG. 4A and the drive voltage $V_{y2}$ is saw-tooth-shaped as illustrated in FIG. 4B. In FIGS. 4A and 4B, $$T_a + T_b = T = 1/60$$

$$T_a : T_b = 9 : 1$$

Figure 5:
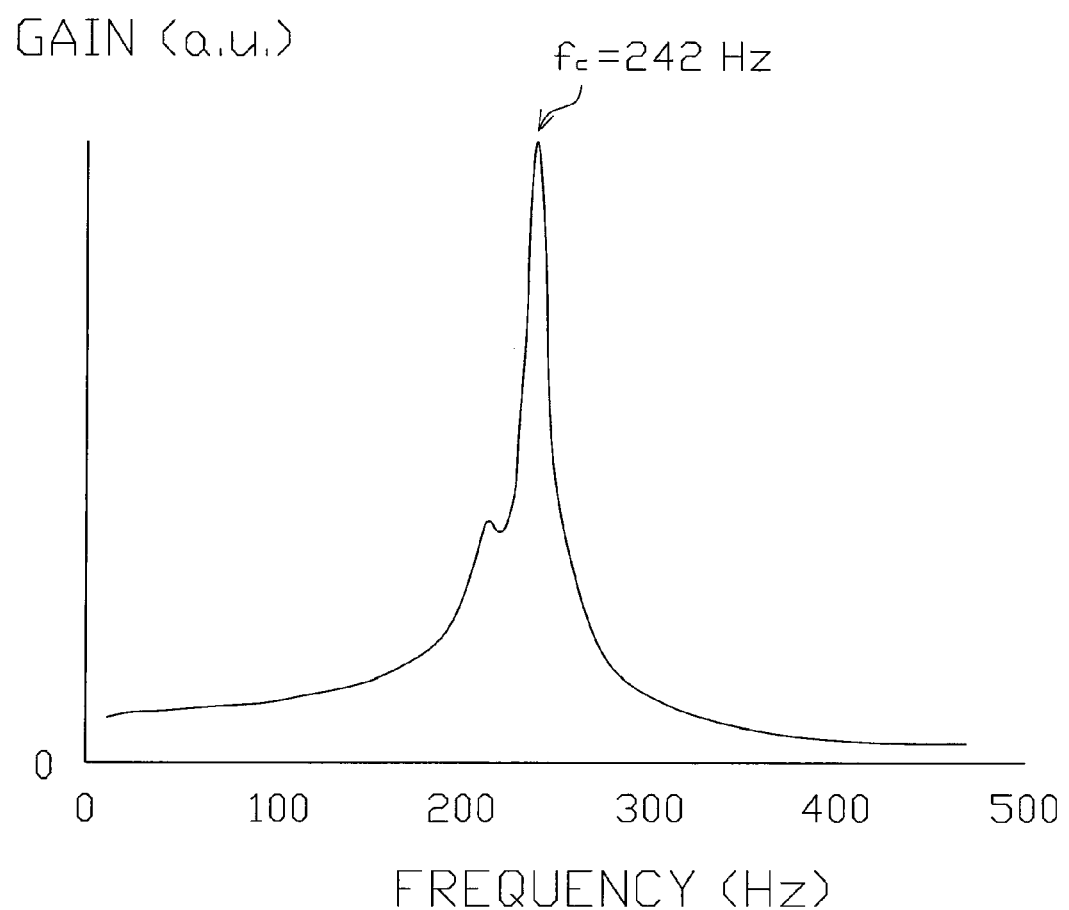
FIG. 5 is an example of an experimentally-obtained frequency spectrum diagram of the mechanically-vibrating system of the mirror of FIG. 1.

In this case, if the outer piezoelectric actuators 6a-1, 6a-2, 6a-3 and 6a-4, 6b-1, 6b-2, 6b-3 and 6b-4 were 35 μm thick, 35 mm long and 0.2 mm wide and their spring constant was $4.5 \times 10^{-3}$ N/cm³, the frequency characteristics were experimentally obtained as illustrated in FIG. 5 where a natural frequency fc is 242 Hz.

Figure 6:
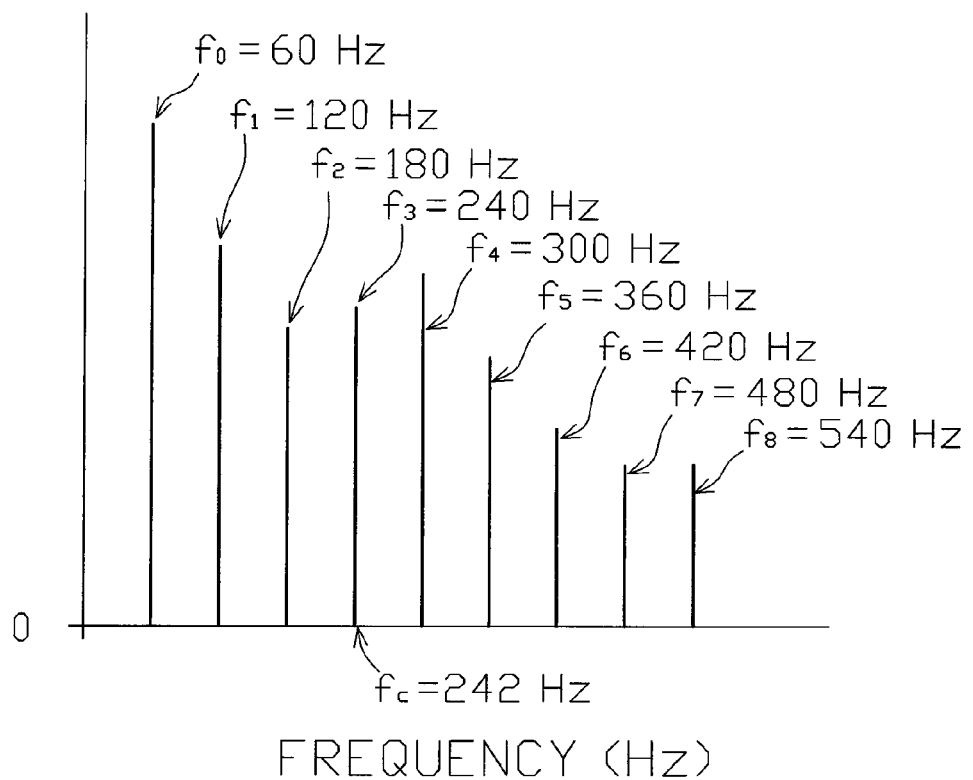
FIG. 6 is a frequency characteristic diagram of the drive voltages $V_{y1}$ and $V_{y2}$ of FIG. 1.

On the other hand, the frequency characteristics of the drive voltages $V_{y1}$ and $V_{y2}$ whose frequency is 60 Hz are illustrated in FIG. 6 where $f_0$ is a fundamental frequency (=60 Hz), $f_1$ is a first-order harmonic frequency component (=120 Hz), $f_2$ is a second-order harmonic frequency component (=180 Hz), $f_3$ is a third-order harmonic frequency component (=240 Hz), . . . .

Therefore, if a harmonic frequency component such as the third-order harmonic frequency component $f_3$ (=240 Hz) of the drive voltages $V_{y1}$ and $V_{y2}$ is close to the natural frequency $f_c$=242 Hz of a mechanically-vibrating system of the mirror 1 with respect to the Y-axis depending upon the outer piezoelectric actuators 6a-1, 6a-2, 6a-3, 6a-4, 6b-1, 6b-2, 6b-3 and 6b-4, the third-order harmonic frequency component $f_3$ would resonate with the natural frequency $f_c$=242 Hz, so that the natural frequency $f_c$ would appear in the deflection angle A of the mirror 1 as illustrated in FIG. 4C.

According to the presently disclosed subject matter, modified synchronous saw-tooth drive voltages $V_{y1}$ and $V_{y2}$ are used instead of the synchronous saw-tooth drive voltages $V_{y1}$ and $V_{y2}$ of FIGS. 4A and 4B, so that the high harmonic components caused by the resonance of the drive voltages $V_{y1}$ and $V_{y2}$ with the natural frequency $f_c$ can be compensated for. Also, the amplitudes of the drive voltages $V_{y1}$ and $V_{y2}$ are adjusted, so that the above-mentioned high harmonic components can be more completely compensated for.

Figure 7:
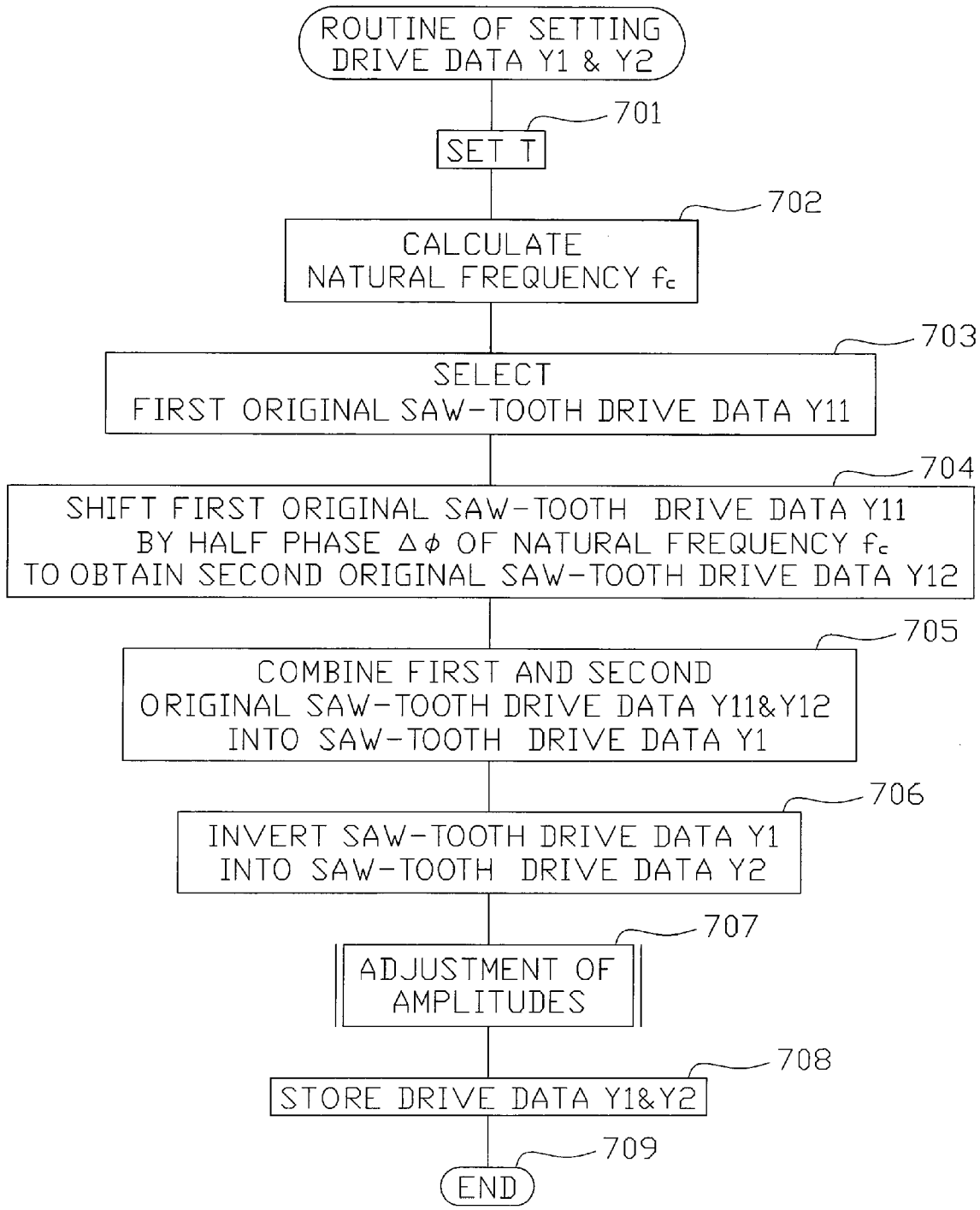
FIG. 7 is a flowchart for explaining the setting of the drive data of the outer piezoelectric actuators as an operation of the control circuit of FIG. 1.

FIG. 7 is a flowchart for explaining an example of setting the drive data $V_{y1}$ and $V_{y2}$ of the outer piezoelectric actuators as an operation of the control circuit 21 of FIG. 1.

First, referring to step 701, a period T of the drive voltages $V_{y1}$ and $V_{y2}$ is set in accordance with the customer's request and so on. For example, if the vertical deflection is carried out at a frequency of 60 Hz, $$T \leftarrow 1/60$$

where T is a period.

Next, referring to step 702, the CPU of the control circuit 21 calculates a natural frequency $f_c$ of the mechanically-vibrating system of the mirror 1 with respect to the Y-axis depending upon the structure of the outer piezoelectric actuators 6a-1, 6a-2, 6a-3 and 6a-4, 6b-1, 6b-2, 6b-3 and 6b-4. In this case, since the outer piezoelectric actuators 6a-1, 6a-2, 6a-3 and 6a-4; 6b-1, 6b-2, 6b-3 and 6b-4 can be considered to be a distribution constant system of serially-connected cantilevers, so that the maximum value of an elastic energy can be equivalent to the maximum value of a kinetic energy due to Rayleigh's law, the high frequency component $f_c$ of the mirror 1 due to the resonance phenomenon is approximated to $$f_c = (1/2\pi) \cdot \sqrt{(35 \times E \times t^2 / 33 \times \rho \times (L \times n)^4)}$$

where E is a modulus of direct elasticity of the piezoelectric actuators 6a-1, 6a-2, 6a-3 and 6a-4, 6b-1, 6b-2, 6b-3 and 6b-4;

t is a thickness of the piezoelectric actuators 6a-1, 6a-2, 6a-3 and 6a-4, 6b-1, 6b-2, 6b-3 and 6b-4;

ρ is a density of the piezoelectric actuators 6a-1, 6a-2, 6a-3 and 6a-4, 6b-1, 6b-2, 6b-3 and 6b-4;

L is a length of the piezoelectric actuators 6a-1, 6a-2, 6a-3 and 6a-4, 6b-1, 6b-2, 6b-3 and 6b-4; and n is the number of the piezoelectric actuators 6a-1, 6a-2, 6a-3 and 6a-4, 6b-1, 6b-2, 6b-3 and 6b-4.

Even in this case, for example, when the outer piezoelectric actuators 6a-1, 6a-2, 6a-3 and 6a-4, 6b-1, 6b-2, 6b-3 and 6b-4 are 35 μm thick, 35 mm long and 0.2 mm wide and their spring constant is $4.5 \times 10^{-3}$ N/cm², the frequency characteristics of the mirror 1 are experimentally obtained as illustrated in FIG. 5 where $f_c$=242 Hz is a natural frequency.

Next, referring to step 703, a first original saw-tooth drive data Y11 is selected by designating a ratio of $T_{0a}$ to $T_{0b}$. In this case, $$T_{0a} + T_{0b} = T = 1/60$$

$$T_{0a} > T_{0b}$$

For example, $$T_{0a} : T_{0b} = 9 : 1$$

Figure 8:
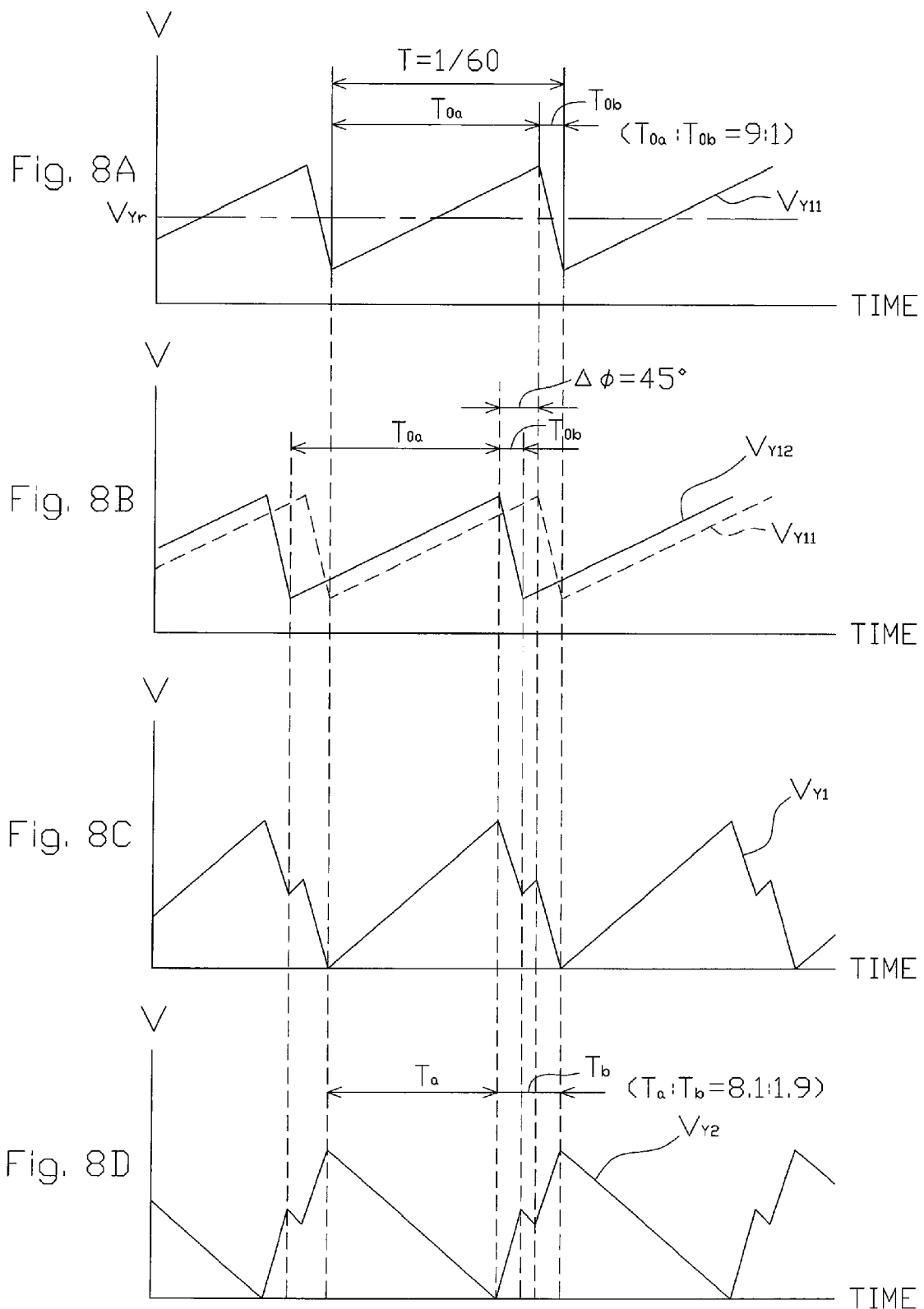
FIGS. 8A, 8B, 8C and 8D are timing diagrams of examples of the drive voltages $V_{y11}$, $V_{y12}$, the drive voltage $V_{y1}$ and the drive voltage $V_{y2}$ at steps 703, 704, 705 and 706 of FIG. 7.

As a result, the saw-tooth drive voltage $V_{y1}$ for the first original saw-tooth drive data Y11 as illustrated in FIG. 8A is selected.

Next, referring to step 704, the first original drive data Y11 is shifted by a half phase $\Delta\phi$, of the resonance frequency (natural frequency) $f_c$ to obtain second original drive data Y12 as illustrated in FIG. 8B. The half phase $\Delta\phi$ is calculated by $$\Delta\phi = 360 \times (f_0/f_c)/2 \text{ (deg)}$$

If $f_0$ is 60 Hz and $f_c$ is 242 Hz, then $$\Delta\phi = 45 \text{ (deg)}$$

Next, referring to step 705, the first and second original saw-tooth drive data Y11 and Y12 are combined into saw-tooth drive data Y1 for a drive voltage $V_{y1}$ as illustrated in FIG. 8C. In this case, $$Y1(t)=\alpha\cdot(Y11(t)+Y12(t))+\beta$$

where t is a time, $\alpha$ is a positive value such as ½, and $\beta$ is an offset value. The offset value $\beta$ is determined in such a way that the minimum value of the saw-tooth drive data Y1 is zero. Thus, since the first and second original saw-tooth drive data Y11(t) and Y12(t) have the same frequency $f_0$, i.e., the same period T and the same amplitude, the saw-tooth drive data Y1 has the frequency $f_0$, i.e., the period T and the definite amplitude.

In FIGS. 8C and 8D, $$T_a+T_b=T=1/60$$

$$T_a=T_{0a}-(\Delta\phi/360)\cdot(1/f_0)$$

$$T_b=T_{0b}+(\Delta\phi/360)\cdot(1/f_0)$$

In this case, in order to satisfy the relationship: $T_a > T_b$, $$f_0\cdot T_{0a} > \tfrac{1}{2}+\Delta\phi/360$$

or $$f_0\cdot T_{0b} < \tfrac{1}{2}+\Delta\phi/360$$

For example, if $f_0=60$ Hz and $f_c=242$ Hz ($\Delta\phi=45$ deg), $$f_0\cdot T_{0a} > 5/8$$

$$f_0\cdot T_{0b} < 3/8$$

Next, referring to step 706, the drive data Y1 is inverted with respect to the reference data Yr into drive data Y2. That is, the drive voltage $V_{y1}$ as illustrated in FIG. 8C is inverted with respect to the reference voltage $V_{Yr}$ into a $T_b:T_a$ saw-tooth drive voltage $V_{y2}$, as illustrated in FIG. 8D.

Next, referring to step 707, the amplitudes of the drive voltages $V_{y1}$ and $V_{y2}$, i.e., the drive data Y1 and Y2 are adjusted for the reason that will be discussed later.

Next, referring to step 708, the drive data Y1 for the drive voltage $V_{y1}$ and the drive data Y2 for the drive voltage $V_{y2}$ are stored in the nonvolatile memories 224 and 225, respectively.

Then, the routine of FIG. 7 is completed by step 709.

Figure 9:
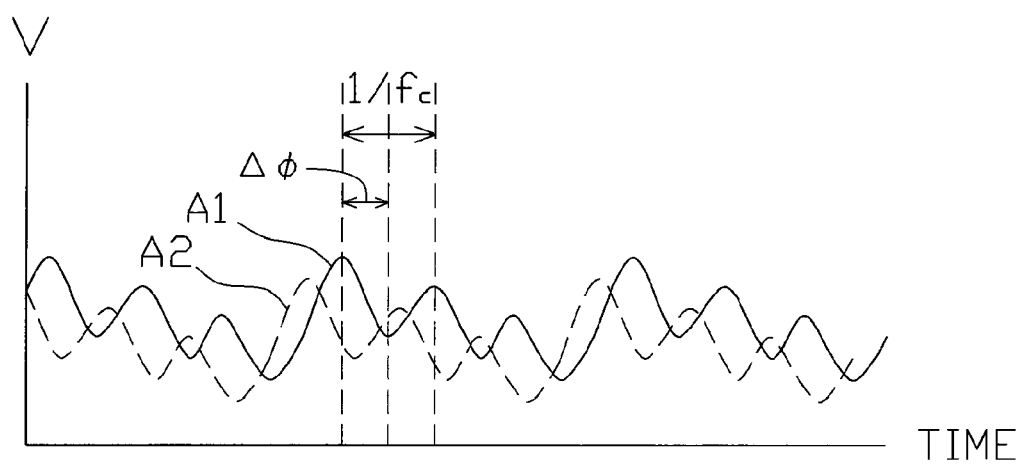
FIG. 9 is a timing diagram for explaining |Δφ| at step 704 of FIG. 7.

By steps 703, 704, 705 and 706, the two synchronous drive data Y1 and Y2 for the synchronous drive voltages $V_{y1}$ and $V_{y2}$ are obtained. In this case, if only the piezoelectric actuators 6a-1, 6a-3; 6b-1, 6b-3 are driven by the drive voltage $V_{y1}$ as illustrated in FIG. 8C, a deflection angle A1 of the mirror 1 indicated by a solid line in FIG. 9 would be obtained. Similarly, if only the piezoelectric actuators 6a-2, 6a-4; 6b-2, 6b-4 are driven by the drive voltage $V_{y2}$ as illustrated in FIG. 8D, a deflection angle A2 of the mirror 1 indicated by a dotted line in FIG. 9 would be obtained. In this case, since the deflection angles A1 and A2 have high frequency components $f_c$ in opposite phase $\Delta\phi$ to each other, when the piezoelectric actuators 6a-1, 6a-3; 6b-1, 6b-3 are driven by the drive voltage $V_{y1}$ as illustrated in FIG. 8C, and simultaneously, the piezoelectric actuators 6a-2, 6a-4; 6b-2, 6b-4 are driven by the drive voltage $V_{y2}$ as illustrated in FIG. 8D, the high frequency component, i.e., the natural frequency $f_c$ included in the deflection angle A1 and the high frequency component, i.e., the natural frequency $f_c$ included in the deflection angle A2 are compensated for by each other. However, generally, the amplitude of the high frequency component $f_c$ included in the deflection angle A1 is different from the amplitude of the high frequency component $f_c$ included in the deflection angle A2 due to the length of connections and the loads of the outer piezoelectric actuators 6a-1, 6a-2, 6a-3 and 6a-4; 6b-1, 6b-2, 6b-3 and 6b-4 and so on. Therefore, in order to more completely compensate for the high frequency component $f_c$ included in both of the deflection angles A1 and A2 of FIG. 9, at step 707, the amplitude of the drive voltage $V_{y1}$ and/or the amplitude of the drive voltage $V_{y2}$, i.e., the drive data Y1 and/or Y2 are adjusted in such a way that the amplitude of the deflection angle A1 when only the drive voltage $V_{y1}$ is applied without applying the drive voltage $V_{y2}$ is equal to the amplitude of the deflection angle A2 when only the drive voltage $V_{y2}$ is applied without applying the drive voltage $V_{y1}$.

Figure 10:
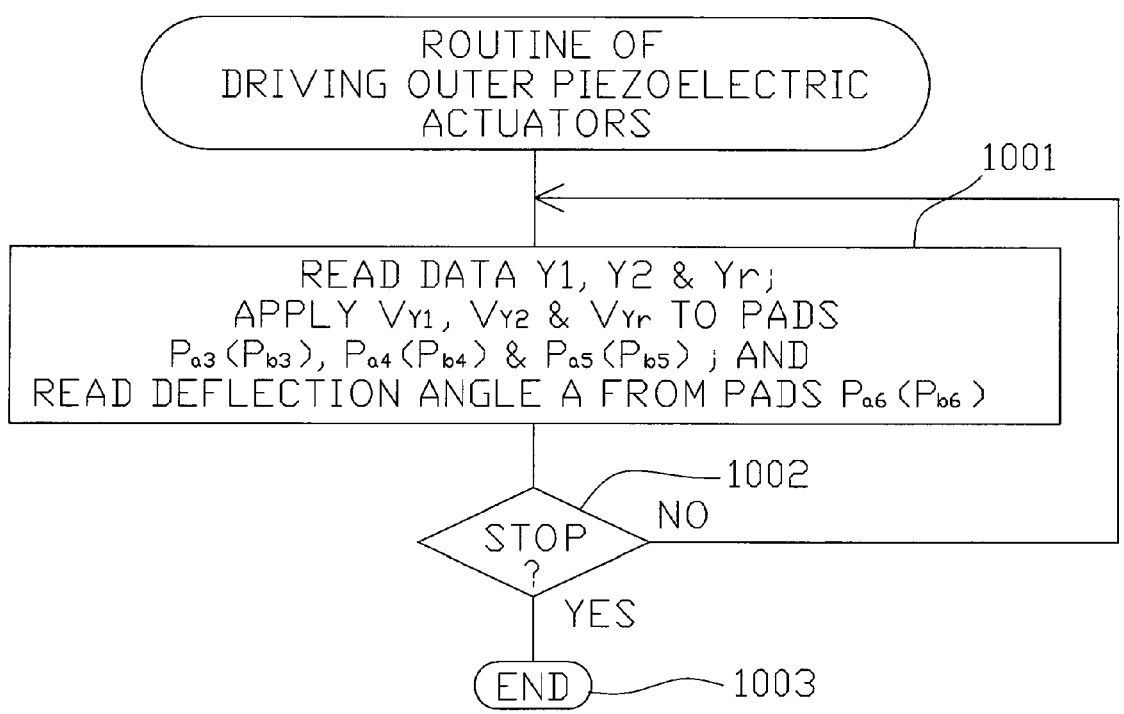
FIG. 10 is a flowchart for explaining the driving of the outer piezoelectric actuators as an operation of the control circuit of FIG. 1.

FIG. 10 is a flowchart for explaining the driving of the outer piezoelectric actuators as an operation of the control circuit 21 of FIG. 1 in accordance with the drive data Y1, Y2 and Yr stored in the nonvolatile memories 224, 225 and 226 by the routine of FIG. 7.

Figure 11A:
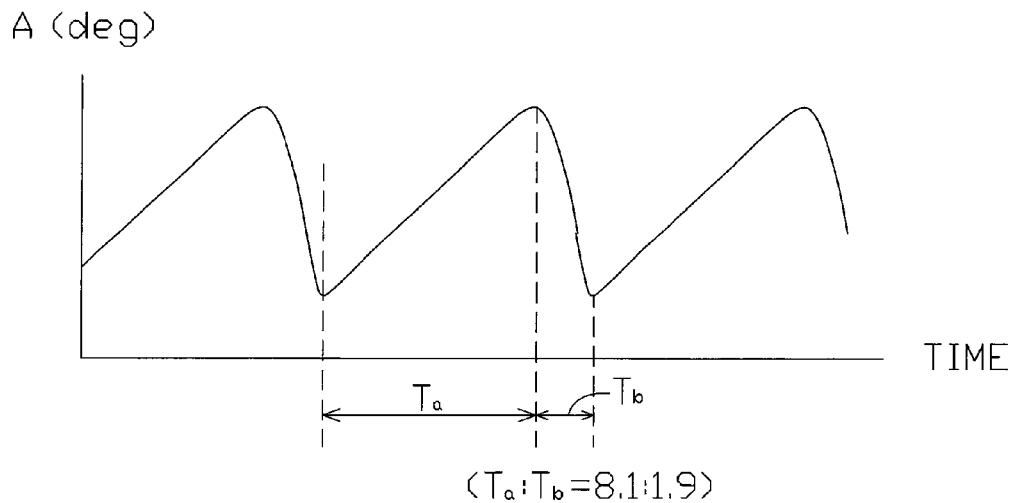
FIGS. 11A and 11B are timing diagrams for explaining the deflection angle A and its frequency characteristics in the flowchart of FIG. 10.
Figure 11B:
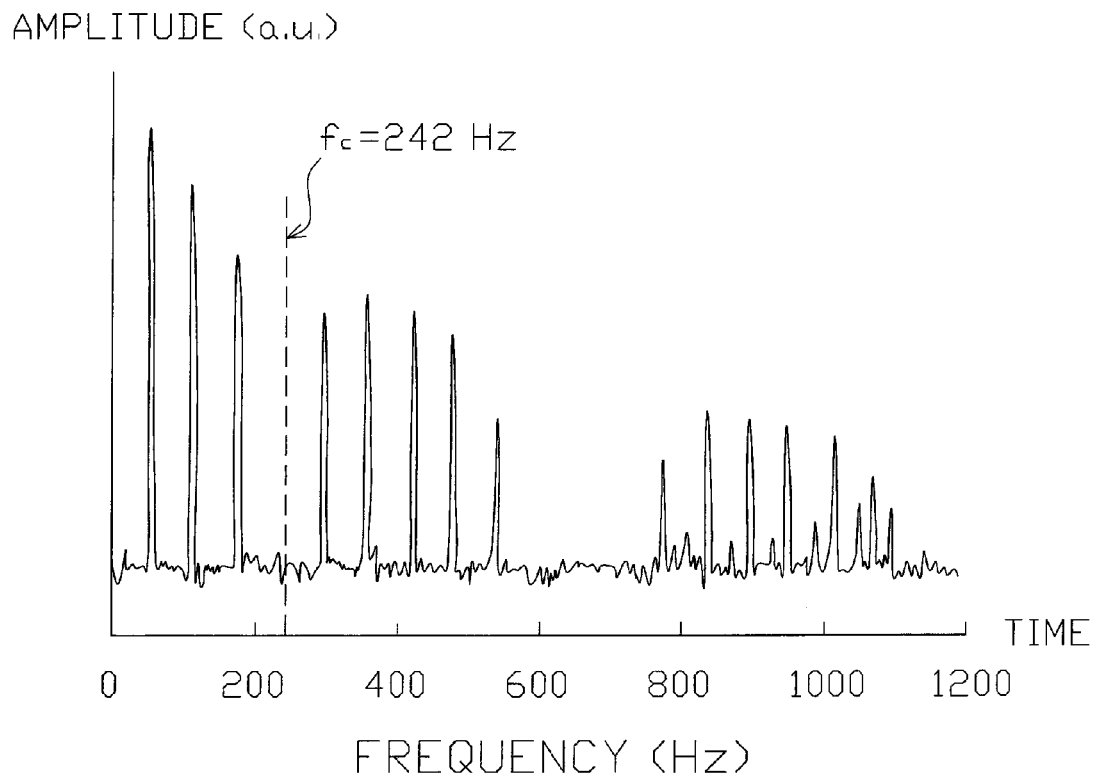

Referring to step 1001, the drive data Y1 and Y2 are sequentially read out of the nonvolatile memories 224 and 225, so that the drive voltage $V_{y1}$ as illustrated in FIG. 8C is applied to the odd-numbered group of the outer piezoelectric actuators 6a-1, 6a-3, 6b-1 and 6b-3, and the drive voltage $V_{y2}$ as illustrated in FIG. 8D is applied to the even-numbered group of the outer piezoelectric actuators 6a-2, 6a-4, 6b-2 and 6b-4. Simultaneously, a deflection angle A of the mirror 1 as illustrated in FIG. 11A is read from the pads $P_{a6}$ and $P_{b6}$. As illustrated in FIG. 11B, the deflection angle A includes no resonance frequency component $f_c$.

Then, step 1001 of FIG. 10 is repeated by step 1002 until a stop message is input or generated. When the stop message is input or generated, the routine of FIG. 10 is completed by step 1003.

In FIG. 11A, $$\begin{aligned}
T_a &= T_{0a} - (\Delta\phi/360)\cdot(1/f_0) \\
&= 9 - (45/360)\cdot(1/40) \\
&= 8.1
\end{aligned}$$

$$\begin{aligned}
T_b &= T_{0b} + (\Delta\phi/360)\cdot(1/f_0) \\
&= 1 + (45/360)\cdot(1/40) \\
&= 1.9
\end{aligned}$$

Therefore, a sufficiently-long effective scanning period of about 80% for one period T can be obtained.

Figure 12A:
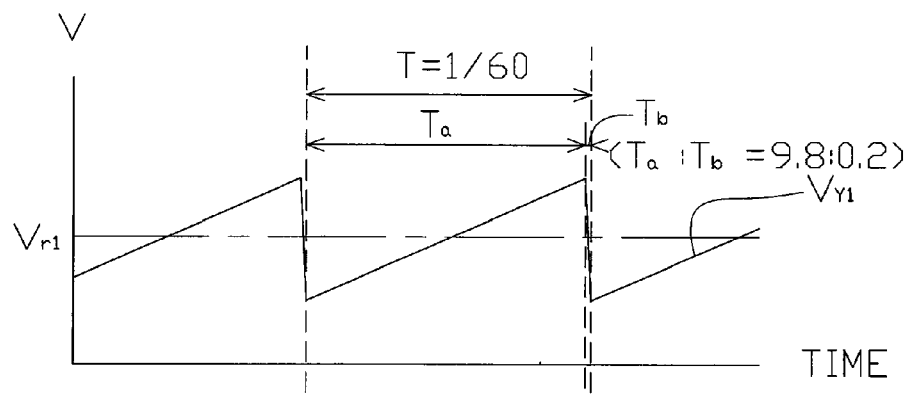
FIGS. 12A, 12B and 12C are timing diagrams for illustrating other examples of the drive voltages $V_{y1}$, $V_{y2}$ and the deflection angle A of FIG. 1 when the driver of FIG. 1 is applied to the prior art.
Figure 12B:
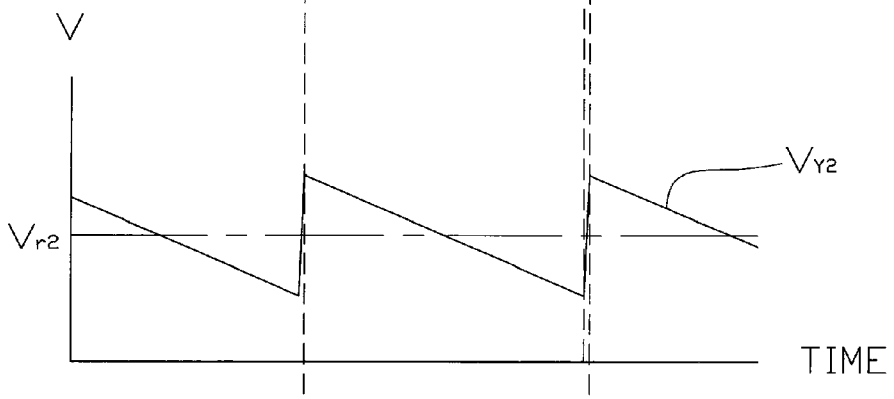

Additionally, assume that the drive voltage $V_{y1}$ is saw-tooth-shaped as illustrated in FIG. 12A and the drive voltage $V_{y2}$ is saw-tooth-shaped as illustrated in FIG. 12B. In FIGS. 12A and 12B, $$T_a+T_b=T=1/60$$

$$T_a:T_b=9.8:0.2$$

Figure 13:
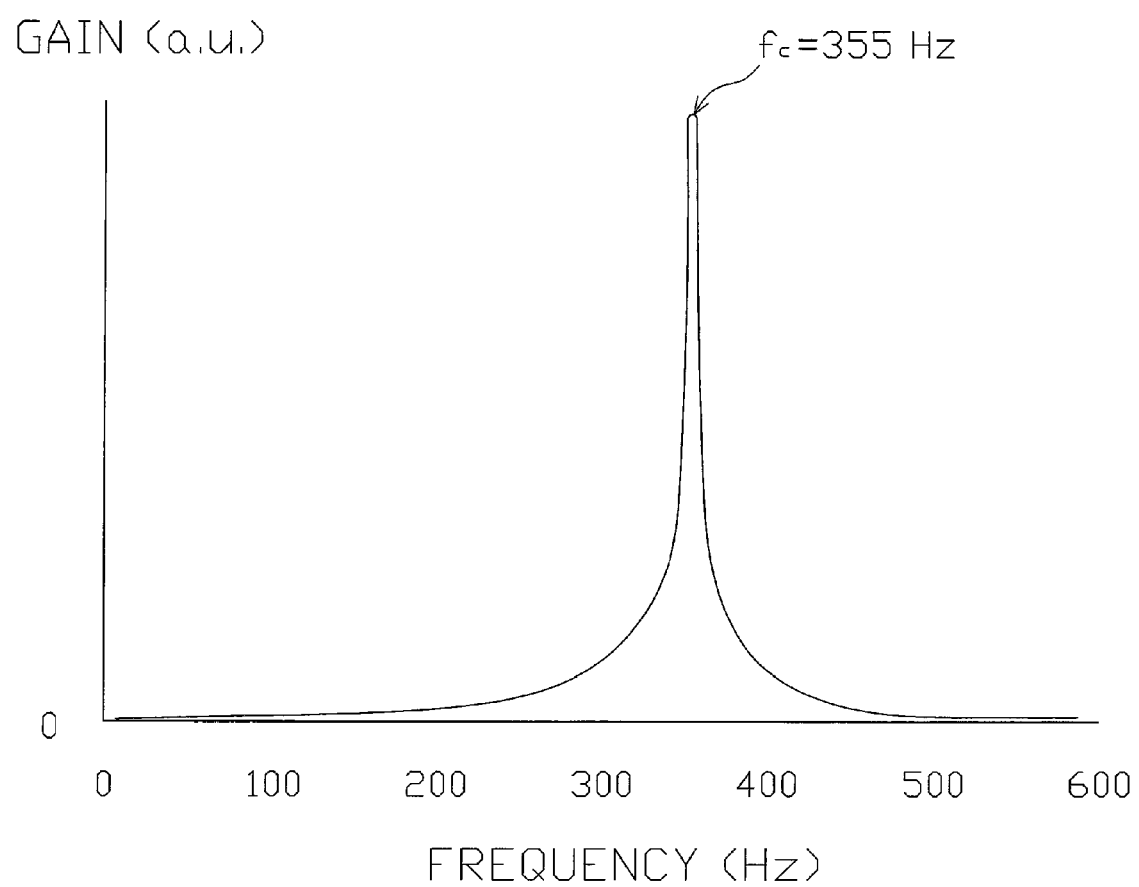
FIG. 13 is another example of an experimentally-obtained frequency spectrum diagram of the mechanically-vibrating system of the mirror of FIG. 1.

In this case, if the outer piezoelectric actuators 6a-1, 6a-2, 6a-3 and 6a-4, 6b-1, 6b-2, 6b-3 and 6b-4 were 40 µm thick, 35 mm long and 0.2 mm wide and their spring constant was $1.0\times10^{-3}$ N/cm$^3$, the frequency characteristics were experimentally obtained as illustrated in FIG. 13 where a natural frequency $f_c$ is 355 Hz.

On the other hand, the frequency characteristics of the drive voltages $V_{y1}$ and $V_{y2}$ whose frequency is 60 Hz are illustrated in FIG. 6.

Figure 12C:
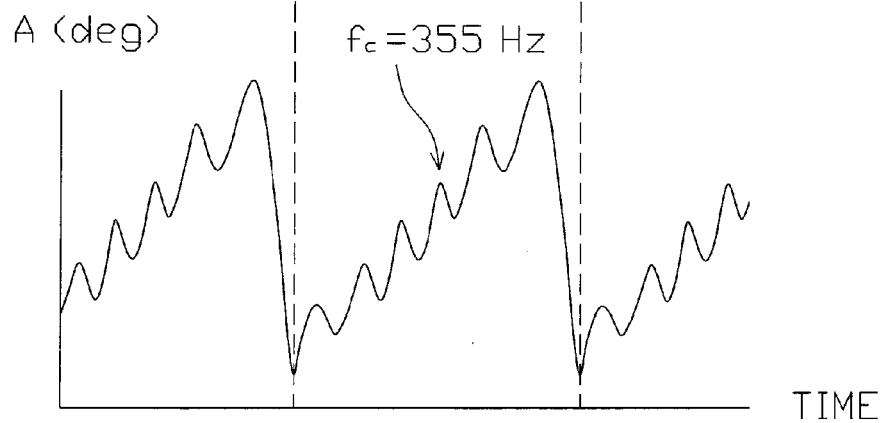

Therefore, if a harmonic frequency component such as the fifth-order harmonic frequency component $f_5$ (=360 Hz) of the drive voltages $V_{y1}$ and $V_{y2}$ is close to the natural frequency $f_c$=355 Hz of a mechanically-vibrating system of the mirror 1 with respect to the Y-axis depending upon the outer piezoelectric actuators 6a-1, 6a-2, 6a-3, 6a-4, 6b-1, 6b-2, 6b-3 and 6b-4, the fifth-order harmonic frequency component $f_5$ would resonate with the natural frequency $f_c$=355 Hz, so that the natural frequency $f_c$ would appear in the deflection angle A of the mirror 1 as illustrated in FIG. 12C.

According to the presently disclosed subject matter, modified synchronous saw-tooth drive voltages $V_{Y1}$ and $V_{Y2}$ generated by the flowchart of FIG. 7 are used instead of the synchronous saw-tooth drive voltages $V_{Y1}$ and $V_{Y2}$ of FIGS. 12A and 12B, so that the high harmonic components caused by the resonance of the drive voltages $V_{Y1}$ and $V_{Y2}$ with the natural frequency $f_c$ can be compensated for. Also, the amplitudes of the drive voltages $V_{Y1}$ and $V_{Y2}$ are adjusted, so that the above-mentioned high harmonic components can be more completely compensated for.

In this case, for example, when the outer piezoelectric actuators 6a-1, 6a-2, 6a-3 and 6a-4, 6b-1, 6b-2, 6b-3 and 6b-4 are 40 μm thick, 35 mm long and 0.2 mm wide and their spring constant is $1.0 \times 10^{-3}$ N/cm², the frequency characteristics of the mirror 1 are experimentally obtained as illustrated in FIG. 13 where $f_c$=355 Hz is a natural frequency.

Also, a first original saw-tooth drive data Y11 is selected by designating a ratio of $T_{0a}$ to $T_{0b}$. In this case, $$T_{0a}+T_{0b}=T=1/60$$

$$T_{0a}>T_{0b}$$

For example, $$T_{0a}:T_{0b}=9.8:0.2$$

As a result, the saw-tooth drive voltage $V_{Y1}$ for the first original saw-tooth drive data Y11 as illustrated in FIG. 14A is selected.

The first original drive data Y11 is shifted by a half phase $\Delta\phi$ of the resonance frequency (natural frequency) $f_c$ to obtain second original drive data Y12 as illustrated in FIG. 14B. Since $f_0$ is 60 Hz and $f_c$ is 355 Hz, the half phase $\Delta\phi$ is calculated by $$\Delta\phi=360\times(f_0/f_c)/2 \text{ (deg)}$$

$$\Delta\phi=30 \text{ (deg)}$$

The first and second original saw-tooth drive data Y11 and Y12 are combined into saw-tooth drive data Y1 for a drive voltage $V_{Y1}$ as illustrated in FIG. 14C.

The drive data Y1 is inverted with respect to the reference data Yr into drive data Y2. That is, the drive voltage $V_{Y1}$ as illustrated in FIG. 14C is inverted with respect to the reference voltage $V_{Yr}$ into a $T_b:T_2$ saw-tooth drive voltage $V_{Y2}$, as illustrated in FIG. 14D.

Figure 15A:
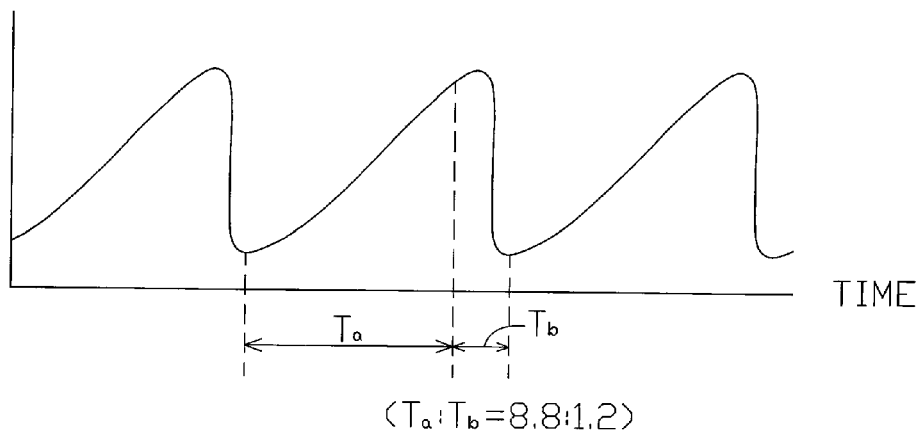
FIGS. 15A and 15B are other timing diagrams for explaining the deflection angle A and its frequency characteristics in the flowchart of FIG. 10.
Figure 15B:
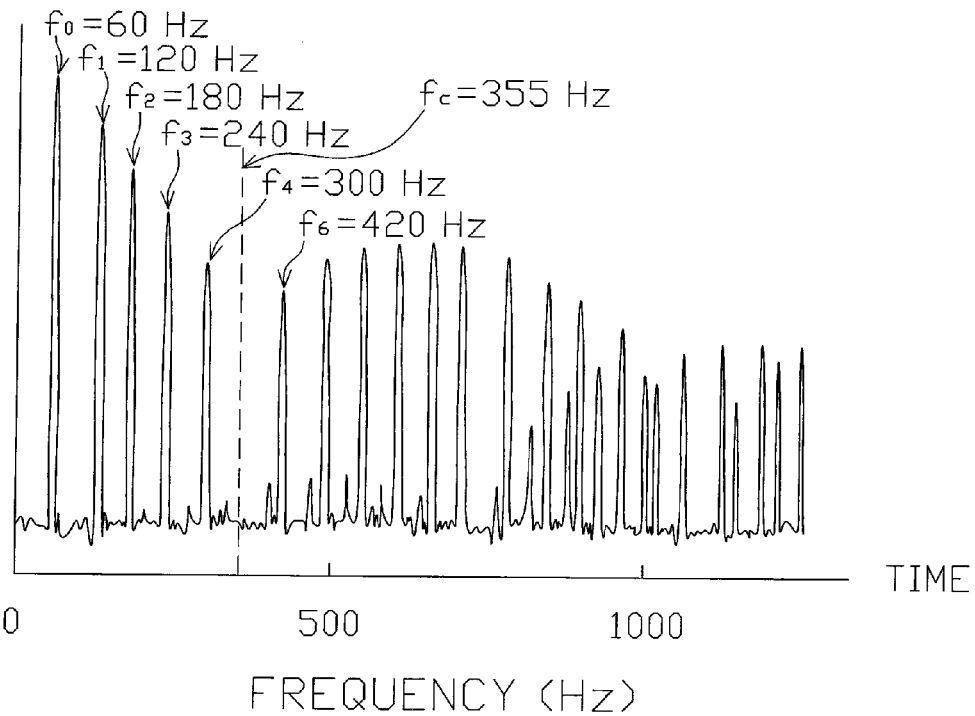

When the drive voltage $V_{Y1}$ as illustrated in FIG. 14C is applied to the odd-numbered group of the outer piezoelectric actuators 6a-1, 6a-3, 6b-1 and 6b-3, and the drive voltage $V_{Y2}$ as illustrated in FIG. 14D is applied to the even-numbered group of the outer piezoelectric actuators 6a-2, 6a-4, 6b-2 and 6b-4, a deflection angle A of the mirror 1 as illustrated in FIG. 15A is obtained so that the deflection angle A includes no resonance frequency component f, as illustrated in FIG. 15B.

In FIG. 15A, $$T_a = T_{0a} - (\Delta\phi/360) \cdot (1/f_0)$$
$$= 9.8 - (45/360) \cdot (1/40)$$
$$= 8.8$$

-continued $$T_b = T_{0b} + (\Delta\phi/360) \cdot (1/f_0)$$
$$= 0.2 + (45/360) \cdot (1/40)$$
$$= 1.2$$

Therefore, a sufficiently-long effective scanning period of about 90% for one period T can be obtained.

At step 1001, note that the drive voltage $V_{Y1}$ as illustrated in FIG. 8C can be applied to the even-numbered group of the outer piezoelectric actuators 6a-2, 6a-4, 6b-2 and 6b-4, and the drive voltage $V_{Y2}$ as illustrated in FIG. 8D can be applied to the odd-numbered group of the outer piezoelectric actuators 6a-1, 6a-3, 6b-1 and 6b-3.

According to the above-described embodiment, since the rising period (or falling period) of the drive voltage $V_{Y1}$ and the falling period (or rising period) of the drive voltage $V_{Y2}$ are larger than the falling period (or rising period) of the drive voltage $V_{Y1}$ and the rising period (or falling period) of the drive voltage $V_{Y2}$, the deflection angle can be linearly changed for a longer period so that the optical deflector according to the presently disclosed subject matter can be applied to an image display apparatus such as a projector.

Also, according to the above-described embodiments, the resonation of the harmonic frequency components of the drive voltage $V_{Y1}$ and $V_{Y2}$ with the natural frequency components of the mechanically-vibrating system of the mirror 1 can be suppressed.

Further, the routines of FIGS. 7 and 10 are stored as programs in the ROM or the like of the control circuit 21.

Furthermore, when the two-dimensional optical deflector of FIG. 1 has the same inner piezoelectric actuators without the torsion bars as the outer piezoelectric actuators, the presently disclosed subject matter can also be applied to such an optical deflector.

Further, the presently disclosed subject matter can be applied to a one-dimensional optical deflector which is constructed by a mirror; a movable frame for supporting the mirror; a support body surrounding the movable frame; and piezoelectric actuators fixed between the support body and the movable frame and serving as cantilevers for rocking the mirror through the movable frame with respect to an axis of the mirror.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A driver for driving an optical deflector comprising:
a mirror;
a movable frame for supporting said mirror;
a support body surrounding said movable frame; and
a first group of piezoelectric actuators serving as cantilevers and a second group of piezoelectric actuators serving as cantilevers alternating with said first group of piezoelectric actuators,
said piezoelectric actuators being folded at every actuator and connected from said support body to said movable frame, each of said piezoelectric actuators being in parallel with one axis of said mirror, said driver combining first and second original saw-tooth waves having the same waveforms into first saw-tooth waves;

said driver generating a first drive voltage having said first saw-tooth waves, and applying said first drive voltage to said first group of piezoelectric actuators, and said driver generating a second drive voltage having second saw-tooth waves opposite in phase to said first saw-tooth waves, and applying said second drive voltage to said second group of piezoelectric actuators, wherein a non-zero difference in phase $\Delta\phi$ between said first and second original saw-tooth waves is a predetermined value to compensate for high harmonic components of a fundamental frequency of said first and second original saw-tooth waves caused by resonance of said first and second drive voltages with a natural frequency of a mechanically-vibrating system of said mirror with respect to said axis of the mirror depending upon said piezoelectric actuators, and wherein said fundamental frequency is lower than said natural frequency.

2. The driver as set forth in claim 1, wherein said non-zero difference in phase is determined by:

$$\Delta\phi = 360 \times (f_0/f_c)/2 \text{ (deg)}$$

where $f_0$ is a frequency of said first and second original saw-tooth waves; and $f_c$ is said natural frequency.

3. The driver as set forth in claim 1, wherein an amplitude of a deflection angle of said mirror when only said first drive voltage is applied to said first group of piezoelectric actuators without application of said second drive voltage is made equal to an amplitude of a deflection angle of said mirror when only said second drive voltage is applied to said second group of piezoelectric actuators without application of said first drive voltage.

* * * * *